(12) United States Patent
Nishikawa et al.

(10) Patent No.: US 11,774,598 B2
(45) Date of Patent: Oct. 3, 2023

(54) INFORMATION PROCESSING DEVICE, INFORMATION PROCESSING METHOD, AND COMPUTER READABLE MEDIUM

(71) Applicant: Mitsubishi Electric Corporation, Tokyo (JP)

(72) Inventors: Kazuhiro Nishikawa, Tokyo (JP); Seigo Fujita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 185 days.

(21) Appl. No.: 17/428,279

(22) PCT Filed: Apr. 2, 2019

(86) PCT No.: PCT/JP2019/014700
§ 371 (c)(1),
(2) Date: Aug. 4, 2021

(87) PCT Pub. No.: WO2020/202476
PCT Pub. Date: Oct. 8, 2020

(65) Prior Publication Data
US 2022/0120913 A1   Apr. 21, 2022

(51) Int. Cl.
*G01S 19/07* (2010.01)
*G01S 19/05* (2010.01)
*G01S 19/23* (2010.01)

(52) U.S. Cl.
CPC .............. *G01S 19/07* (2013.01); *G01S 19/05* (2013.01); *G01S 19/23* (2013.01)

(58) Field of Classification Search
CPC ........... G01S 19/07; G01S 19/05; G01S 19/23
USPC ........................................................... 342/352
See application file for complete search history.

(56) References Cited

U.S. PATENT DOCUMENTS 9,453,921 B1 * 9/2016 Bell .................. G01S 19/49

FOREIGN PATENT DOCUMENTS

CN    101839986 B  * 10/2012
JP    2013-101013 A    5/2013

OTHER PUBLICATIONS

International Search Report and Written Opinion dated Jun. 18, 2019, received for PCT Application PCT/JP2019/014700, Filed on Apr. 2, 2019, 9 pages including English Translation.

* cited by examiner

*Primary Examiner* — Harry K Liu
(74) *Attorney, Agent, or Firm* — XSENSUS LLP

(57) ABSTRACT

A monitor unit (25) monitors positioning augmentation information for correction of satellite positioning errors, the positioning augmentation information being generated by an augmentation information generation device with use of a specified parameter value being a parameter value which is specified. In a case where an abnormality is detected in the positioning augmentation information by the monitor unit (25), a selection unit (26) selects a reserve parameter value that is to substitute for the specified parameter value, from among a plurality of reserve parameter values being a plurality of parameter values that are different from the specified parameter value and commands the augmentation information generation device to use the selected reserve parameter value as a new specified parameter value.

16 Claims, 14 Drawing Sheets

INFORMATION PROCESSING DEVICE, INFORMATION PROCESSING METHOD, AND COMPUTER READABLE MEDIUM

CROSS-REFERENCE TO RELATED APPLICATION

The present application is based on PCT filing PCT/JP2019/014700, filed Apr. 2, 2019, the entire contents of which are incorporated herein by reference.

TECHNICAL FIELD

The present invention relates to satellite positioning.

BACKGROUND ART

In satellite positioning, improvement in positioning accuracy is made with use of positioning augmentation information (which will be simply referred to as "augmentation information" below). More specifically, the positioning augmentation information that is information for correction of observables of positioning signals is generated and the generated positioning augmentation information is distributed. A positioning terminal can improve an accuracy of a position of the positioning terminal located based on the observables, by correcting the observables of the positioning signals with the positioning augmentation information.

In Patent Literature 1, for instance, a conventional positioning augmentation system is disclosed.

A configuration example of the conventional positioning augmentation system is illustrated in FIG. 14.

The positioning augmentation system 200 may be separated into a cosmic segment 01, a ground segment 02, and a user segment 03.

A quasi-zenith satellite 10 and a positioning satellite 11 are included in the cosmic segment 01.

In the ground segment 02, an electronic reference point network 12, an augmentation information generation device 13, a master control device 14, a tracking control device 15, and a monitor device 16 are included.

A positioning terminal 17 is included in the user segment 03.

In the ground segment 02, the positioning augmentation information is periodically generated by the augmentation information generation device 13. The positioning augmentation information is distributed through the cosmic segment 01 to the user segment 03.

In the user segment 03, observables of positioning signals are corrected by the positioning terminal 17 with the positioning augmentation information received from the cosmic segment 01 and are then used for navigation processing. Thus a position of the positioning terminal 17 can be located with high accuracy.

The augmentation information generation device 13 in the ground segment 02 calculates coordinate values of each electronic reference point through the navigation processing with use of observables of positioning signals calculated by each electronic reference point. Then the augmentation information generation device 13 generates the positioning augmentation information based on differences between the calculated coordinate values of each electronic reference point and known coordinate values of the electronic reference points. The augmentation information generation device 13 uses Kalman filter, for instance, for generation of the positioning augmentation information. The differences between the coordinate values are caused by a propagation delay of the positioning signals. The augmentation information generation device 13 models ionosphere, troposphere, and the like, for instance, that may become factors in the propagation delay of the positioning signals. Then the augmentation information generation device 13 applies such a model along with a parameter having a fixed value to the Kalman filter. The augmentation information generation device 13 inputs the differences between the coordinate values into the Kalman filter to which the model and the parameter have been applied and generates the positioning augmentation information regarding the propagation delay.

CITATION LIST

Patent Literature

Patent Literature 1: JP 2013-101013 A

SUMMARY OF INVENTION

Technical Problem

In a conventional method, the parameter having the fixed value is used for the generation of the positioning augmentation information. Therefore, abnormal positioning augmentation information is generated in a case where an unexpected state of the ionosphere or the troposphere is brought about, for instance. The abnormal positioning augmentation information is distributed through the cosmic segment 01.

In the user segment 03, the positioning terminal 17 makes use of the abnormal positioning augmentation information and thus an accuracy of a position of the positioning terminal 17 is deteriorated.

Additionally, the unexpected state of the ionosphere, the troposphere, or the like continues for a sufficiently long time relative to a generation period of the positioning augmentation information. Therefore, the augmentation information generation device 13 continuously generates the abnormal positioning augmentation information once the unexpected state of the ionosphere or the troposphere is brought about.

The present invention mainly aims at solving such problems. More specifically, the invention mainly aims at enabling prompt switching to normal positioning augmentation information even in a case where the abnormal positioning augmentation information is generated.

Solution to Problem

An information processing device according to the present invention, includes:

a monitor unit to monitor positioning augmentation information for correction of satellite positioning errors, the positioning augmentation information being generated by an augmentation information generation device with use of a specified parameter value being a parameter value which is specified; and a selection unit, in a case where an abnormality is detected in the positioning augmentation information by the monitor unit, to select a reserve parameter value that is to substitute for the specified parameter value, from among a plurality of reserve parameter values being a plurality of parameter values that are different from the specified parameter value and to command the augmentation information generation device to use the selected reserve parameter value as a new specified parameter value.

Advantageous Effects of Invention

According to the present invention, even in a case where abnormal positioning augmentation information is generated, use of the new specified parameter value enables prompt switching to normal positioning augmentation information.

DESCRIPTION OF EMBODIMENTS

Figure 1:
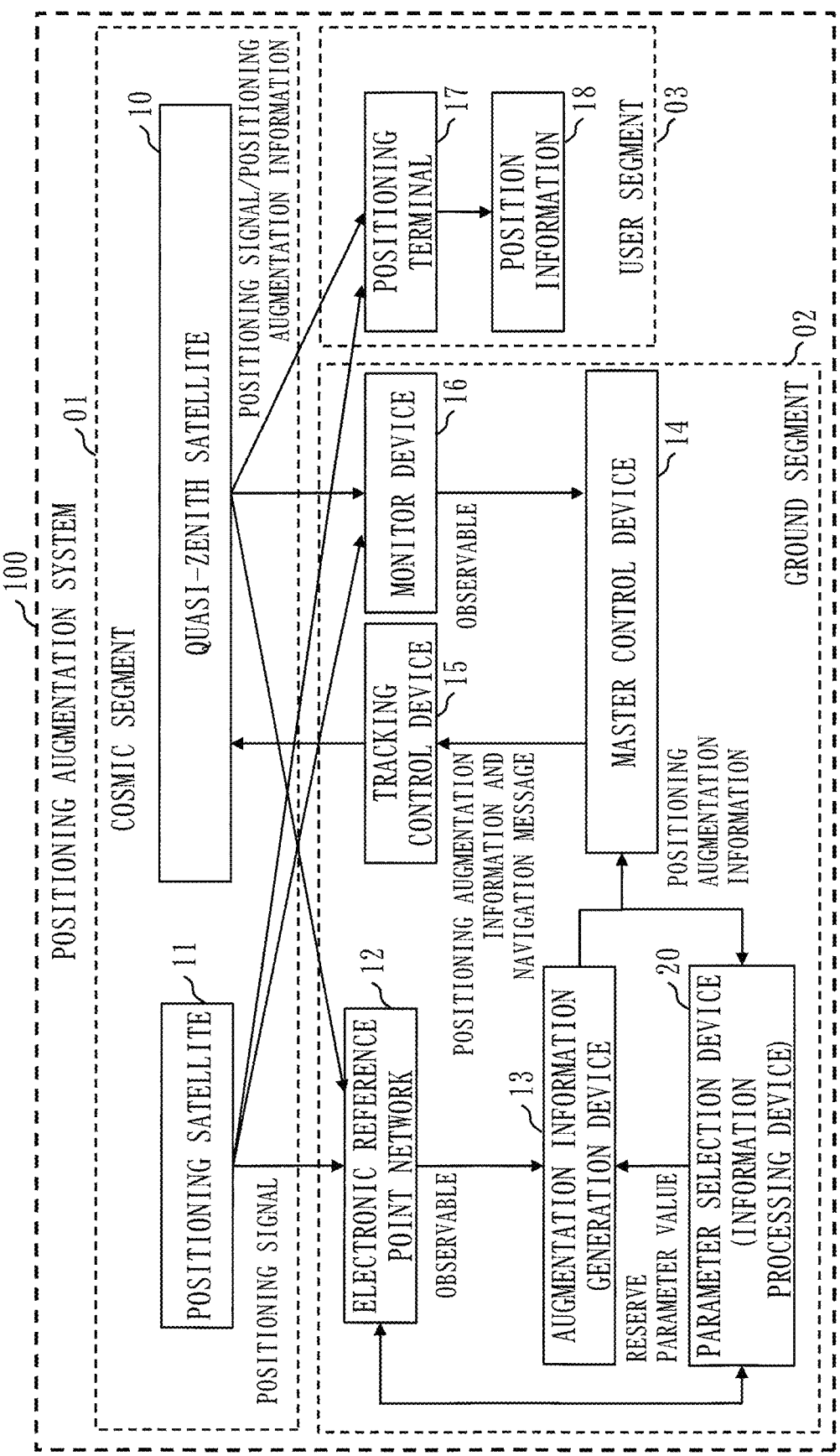
FIG. 1 is a diagram illustrating a configuration example of a positioning augmentation system according to Embodiment 1.

Hereinbelow, embodiments of the present invention will be described with use of the drawings. In descriptions of the embodiments below and the drawings, elements provided with identical reference characters denote identical parts or equivalent parts.

Embodiment 1

*Description of Configuration*

FIG. 1 illustrates a configuration example of a positioning augmentation system 100 according to the present embodiment.

Figure 14:
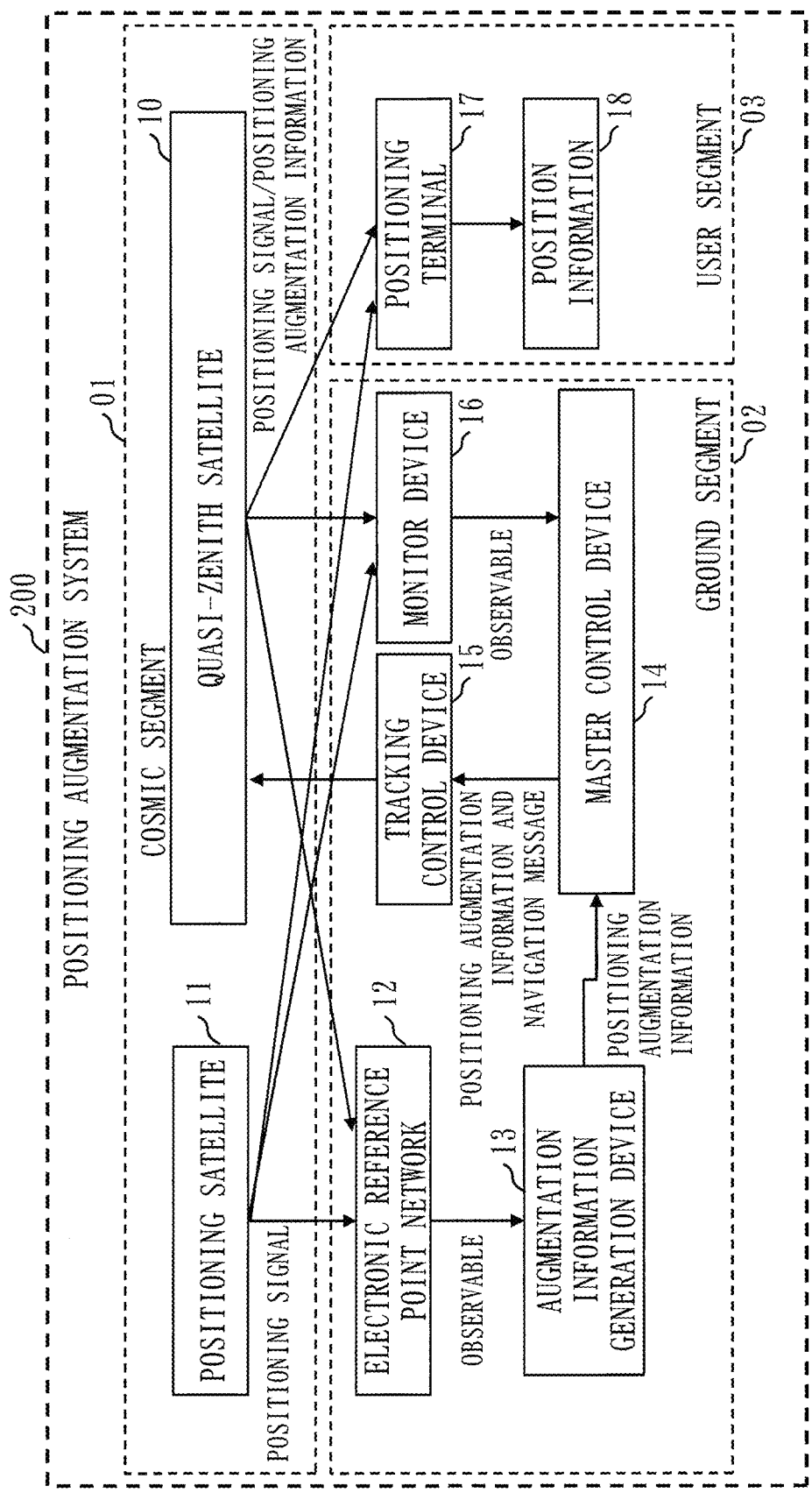
FIG. 14 is a diagram illustrating a configuration example of a conventional positioning augmentation system.

In a configuration of FIG. 1, a parameter selection device 20 is added, compared with a configuration of FIG. 14.

Elements other than the parameter selection device 20 are identical to elements illustrated in FIG. 14.

The parameter selection device 20 is an example of an information processing device. Operations that are performed by the parameter selection device 20 are equivalent to an information processing method and an information processing program.

In the positioning augmentation system 100, following operations are periodically performed. Therefore, the positioning augmentation information is periodically updated.

An electronic reference point network 12 includes a plurality of electronic reference points provided all over Japan. The electronic reference points each receive positioning signals from a positioning satellite 11 and a quasi-zenith satellite 10 and calculate observables (pseudo range, for instance) of the positioning signals.

The augmentation information generation device 13 calculates coordinate values of each of the electronic reference points through navigation processing of the observables of the positioning signals calculated by each of the electronic reference points. The augmentation information generation device 13 generates the positioning augmentation information based on differences between the calculated coordinate values of each of the electronic reference points and known coordinate values of the electronic reference points acquired from the Geographical Survey Institute. The augmentation information generation device 13 uses Kalman filter, for instance, for generation of the positioning augmentation information.

The augmentation information generation device 13 sets the differences between the calculated coordinate values of each of the electronic reference points and the known coordinate values of the electronic reference points, models of ionosphere and troposphere, for instance, that may cause the differences, and parameter values to be applied to the models, in the Kalman filter. Then the augmentation information generation device 13 generates the positioning augmentation information by carrying out arithmetic processing with use of the Kalman filter.

Incidentally, the augmentation information generation device 13 uses a prespecified parameter value for the generation of the positioning augmentation information. The prespecified parameter will be referred to as a specified parameter value below.

The master control device 14 transmits the positioning augmentation information generated by the augmentation information generation device 13 and a navigation message from the tracking control device 15 to the quasi-zenith satellite 10.

The quasi-zenith satellite 10 transmits positioning signals including the navigation message received from the tracking control device 15 and centimeter level positioning augmentation signals L6 signals (frequency of 1278.75 MHz) including the positioning augmentation information received from the tracking control device 15, to the positioning terminal 17.

The positioning terminal 17 (on-board equipment, for instance) receives the positioning signals from the positioning satellite 11 and the quasi-zenith satellite 10 and calculates the observables of the positioning signals.

Additionally, the positioning terminal 17 corrects the calculated observables of the positioning signals based on the positioning augmentation information included in the L6 signals and locates a current position of the positioning terminal 17 with use of the corrected observables of the positioning signals. The located current position of the positioning terminal 17 is outputted as position information 18.

The parameter selection device 20 monitors the positioning augmentation information generated with use of the specified parameter value by the augmentation information generation device 13.

In parallel with the generation of the positioning augmentation information by the augmentation information generation device 13, additionally, the parameter selection device 20 separately generates the positioning augmentation information. The parameter selection device 20 generates a plurality of pieces of the positioning augmentation information with use of a plurality of parameter values that are different from the specified parameter value. The plurality of parameter values that are used by the parameter selection device 20 will be referred to as a plurality of reserve parameter values below.

In a case where an abnormality is detected in the positioning augmentation information generated by the augmentation information generation device 13, the parameter selection device 20 selects less fluctuating positioning augmentation information from among the plurality of pieces of the positioning augmentation information generated with use of the plurality of reserve parameter values. Additionally, the parameter selection device 20 selects the reserve parameter value used for generation of the selected positioning augmentation information. Then the parameter selection device 20 commands the augmentation information generation device 13 to use the selected reserve parameter value as a new specified parameter value.

After that, the augmentation information generation device 13 generates the positioning augmentation information with use of the new specified parameter value commanded from the parameter selection device 20.

Therefore, prompt switching to normal positioning augmentation information can be attained even in a case where the abnormal positioning augmentation information is generated.

Figure 2:
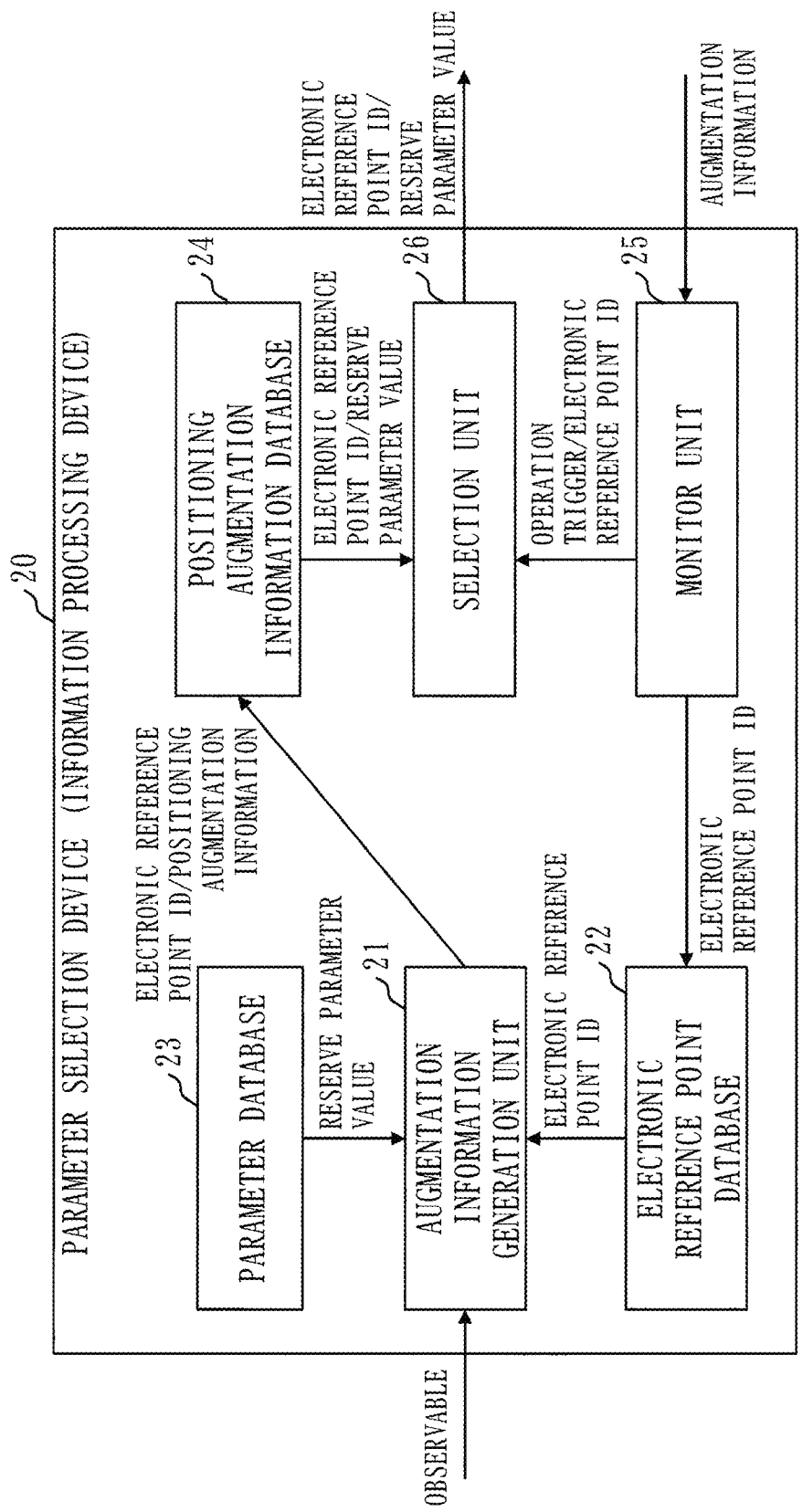
FIG. 2 is a diagram illustrating a functional configuration example of a parameter selection device according to Embodiment 1.

FIG. 2 illustrates a functional configuration example of the parameter selection device 20 according to the embodiment.

The parameter selection device 20 includes an augmentation information generation unit 21, an electronic reference point database 22, a parameter database 23, a positioning augmentation information database 24, a monitor unit 25, and a selection unit 26, as functional configurations.

Details of the augmentation information generation unit 21, the electronic reference point database 22, the parameter database 23, the positioning augmentation information database 24, the monitor unit 25, and the selection unit 26 will be described later. A process that is carried out by the monitor unit 25 is equivalent to a monitor process. A process that is carried out by the selection unit 26 is equivalent to a selection process.

Figure 13:
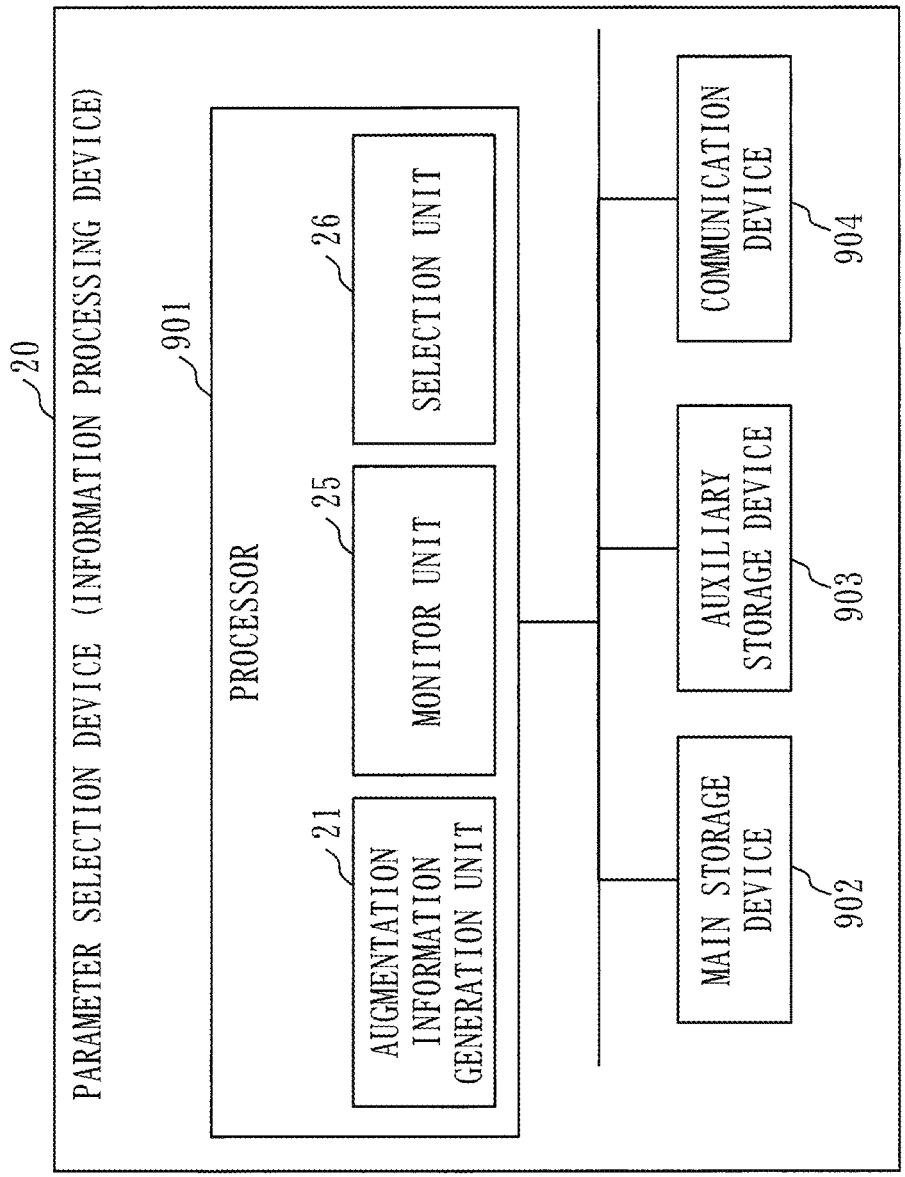
FIG. 13 is a diagram illustrating a hardware configuration example of the parameter selection device according to Embodiment 1.

FIG. 13 illustrates a hardware configuration example of the parameter selection device 20.

The parameter selection device 20 according to the embodiment is a computer.

The parameter selection device 20 includes a processor 901, a main storage device 902, an auxiliary storage device 903, and a communication device 904, as hardware.

Programs that implement functions of the augmentation information generation unit 21, the monitor unit 25, and the selection unit 26 are stored in the auxiliary storage device 903.

The programs are loaded from the auxiliary storage device 903 into the main storage device 902. Then the processor 901 executes the programs and performs operations of the augmentation information generation unit 21, the monitor unit 25, and the selection unit 26 that will be described later.

FIG. 13 schematically represents a state in which the processor 901 executes the programs that implement the functions of the augmentation information generation unit 21, the monitor unit 25, and the selection unit 26.

The electronic reference point database 22, the parameter database 23, and the positioning augmentation information database 24 that are illustrated in FIG. 2 are implemented by the main storage device 902 or the auxiliary storage device 903.

*Description of Operations*

Figure 3:
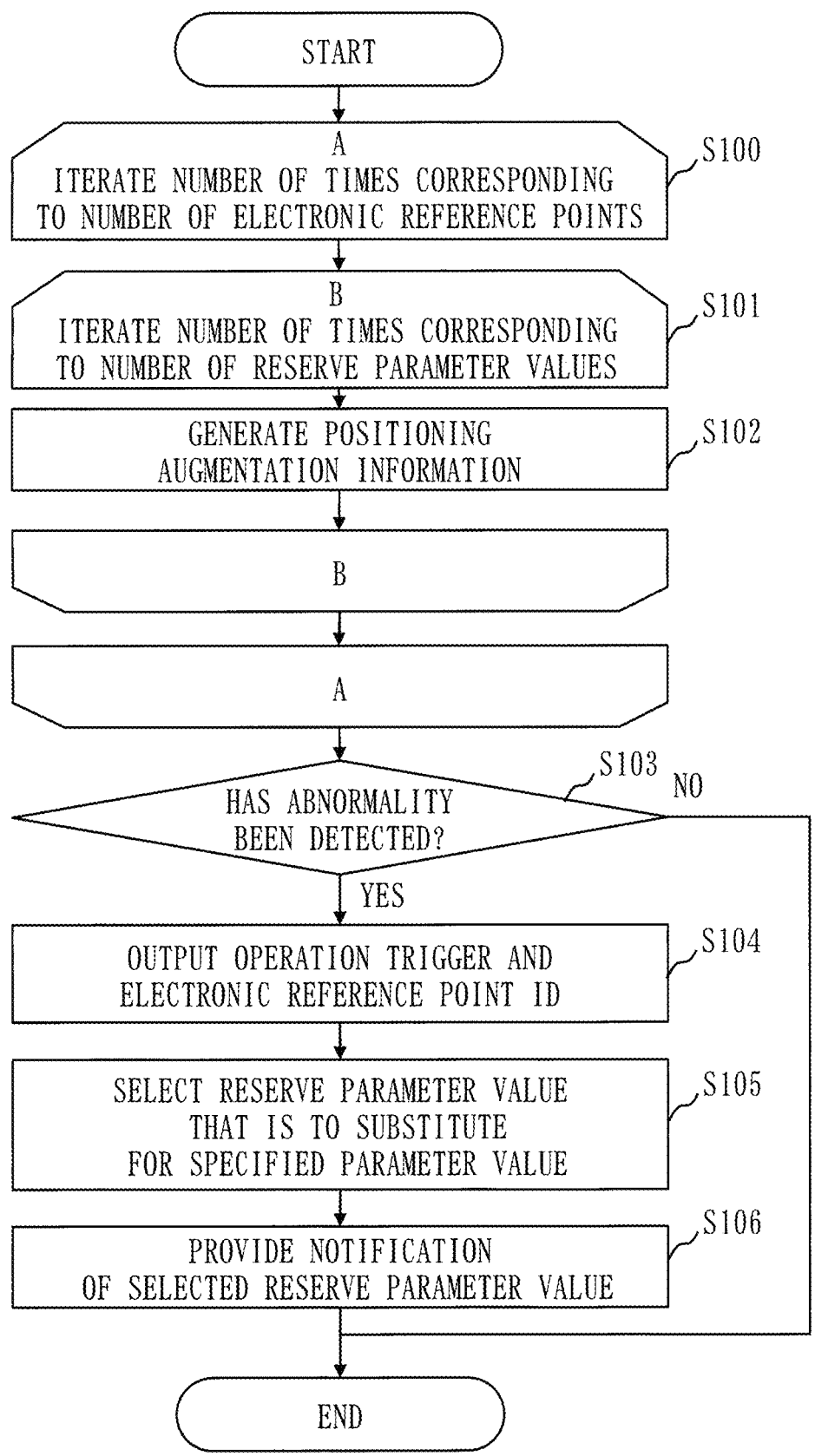
FIG. 3 is a flow chart illustrating an example of operations of the parameter selection device according to Embodiment 1.

With reference to FIG. 3, subsequently, an example of operations of the parameter selection device 20 will be described.

The augmentation information generation unit 21 generates the plurality of pieces of the positioning augmentation information for each of the electronic reference points with use of the plurality of reserve parameter values (step S100 to step S102).

The augmentation information generation unit 21 parallelly generates the plurality of pieces of the positioning augmentation information for each of the electronic reference points.

That is, for electronic reference points that have been notified of IDs (Identifiers) from the electronic reference point database 22, the augmentation information generation unit 21 calculates the coordinate values of each of the electronic reference points through the navigation processing with use of the observables of the positioning signals. Meanwhile, the augmentation information generation unit 21 generates the positioning augmentation information based on the differences between the calculated coordinate values of each of the electronic reference points and the known coordinate values of the electronic reference points acquired from the Geographical Survey Institute. This procedure is parallelly performed for each of the plurality of reserve parameter values acquired from the parameter database 23, so that the plurality of pieces of the positioning augmentation information are parallelly generated. As a result, the augmentation information generation unit 21 obtains the positioning augmentation information for each of the electronic reference points and for each of the reserve parameter values.

The augmentation information generation unit 21 outputs the plurality of pieces of the positioning augmentation information that have been generated, to the positioning augmentation information database 24.

The positioning augmentation information database 24 retains the plurality of pieces of the positioning augmentation information outputted from the augmentation information generation unit 21 for a given time period (one hour, for instance) for each of the electronic reference points and each of the reserve parameter values.

The monitor unit 25 monitors the positioning augmentation information for each of the electronic reference points that has been outputted by the augmentation information generation device 13. Meanwhile, the monitor unit 25 retains the positioning augmentation information for each of the electronic reference points that has been outputted by the augmentation information generation device 13, for a given time period (one hour, for instance).

In a case where the positioning augmentation information for each of the electronic reference points has fluctuated by an extraordinarily great amount exceeding a threshold in a given time period (one hour, for instance) (YES in step S103), the monitor unit 25 notifies the electronic reference point database 22 of the ID of the corresponding electronic reference point. Additionally, the monitor unit 25 outputs the ID of the corresponding electronic reference point and an operation trigger to the selection unit 26 (step S104).

Herein, the threshold is set based on a fluctuation in the positioning augmentation information that was caused when a tropospheric disturbance occurred in past or a fluctuation in the positioning augmentation information was caused when a magnetic storm occurred, for instance.

Incidentally, the monitor unit 25 may detect an abnormal fluctuation in the positioning augmentation information with use of machine learning or the like.

The electronic reference point database 22 retains the ID of the electronic reference point notified by the monitor unit 25.

The selection unit 26 acquires the operation trigger and the ID of the electronic reference point from the monitor unit 25.

Additionally, the selection unit 26 selects a reserve parameter value that is to substitute for the specified parameter value (step S105).

More specifically, the selection unit 26 selects the positioning augmentation information which concerns the electronic reference point having the ID acquired from the monitor unit 25 and whose fluctuation in a given time period (one hour, for instance) is the smallest, from among the plurality of pieces of the positioning augmentation information saved in the positioning augmentation information database 24.

Then the selection unit 26 acquires the reserve parameter value used for calculation of the selected positioning augmentation information from the positioning augmentation information database 24. That is, the selection unit 26 analyzes a fluctuation situation in each of the plurality of pieces of the positioning augmentation information and selects a reserve parameter value used for generation of the positioning augmentation information whose fluctuation is the smallest, from among the plurality of reserve parameter values. This reserve parameter value is the reserve parameter value that is to substitute for the specified parameter value.

After that, the selection unit 26 notifies the augmentation information generation device 13 of the selected reserve parameter value and the ID of the electronic reference point (step S106).

The augmentation information generation device 13 uses the reserve parameter value outputted from the selection unit 26, as the new specified parameter value, for generation of the positioning augmentation information concerning the corresponding electronic reference point.

*Description of Effects of Embodiment*

In parallel with the generation of the positioning augmentation information by the augmentation information generation device 13, in the embodiment, the plurality of pieces of the positioning augmentation information are generated with use of the plurality of reserve parameter values. In a case where an abnormality occurs in the positioning augmentation information from the augmentation information generation device 13, the fluctuation situation in the plurality of pieces of the positioning augmentation information is analyzed and the reserve parameter value that is to substitute for the specified parameter value is selected.

According to the embodiment, therefore, prompt switching to normal positioning augmentation information can be attained even in a case where abnormal positioning augmentation information is generated. According to the embodiment, consequently, a time period during which the abnormal positioning augmentation information is distributed can be minimized. In the positioning terminal, additionally, a time period during which the positioning accuracy is deteriorated can be shortened.

According to the embodiment, additionally, in a case where the positioning augmentation system is newly applied to a region where a geographical condition (climate distribution or the like for troposphere, latitude or the like for ionosphere, for instance) is different, for instance, an appropriate parameter value for which geographical characteristics are considered can be concisely selected.

Embodiment 2

In the present embodiment, differences from Embodiment 1 will be mainly described.

Incidentally, matters that will not be described below are the same as matters of Embodiment 1.

*Description of Configuration*

Figure 4:
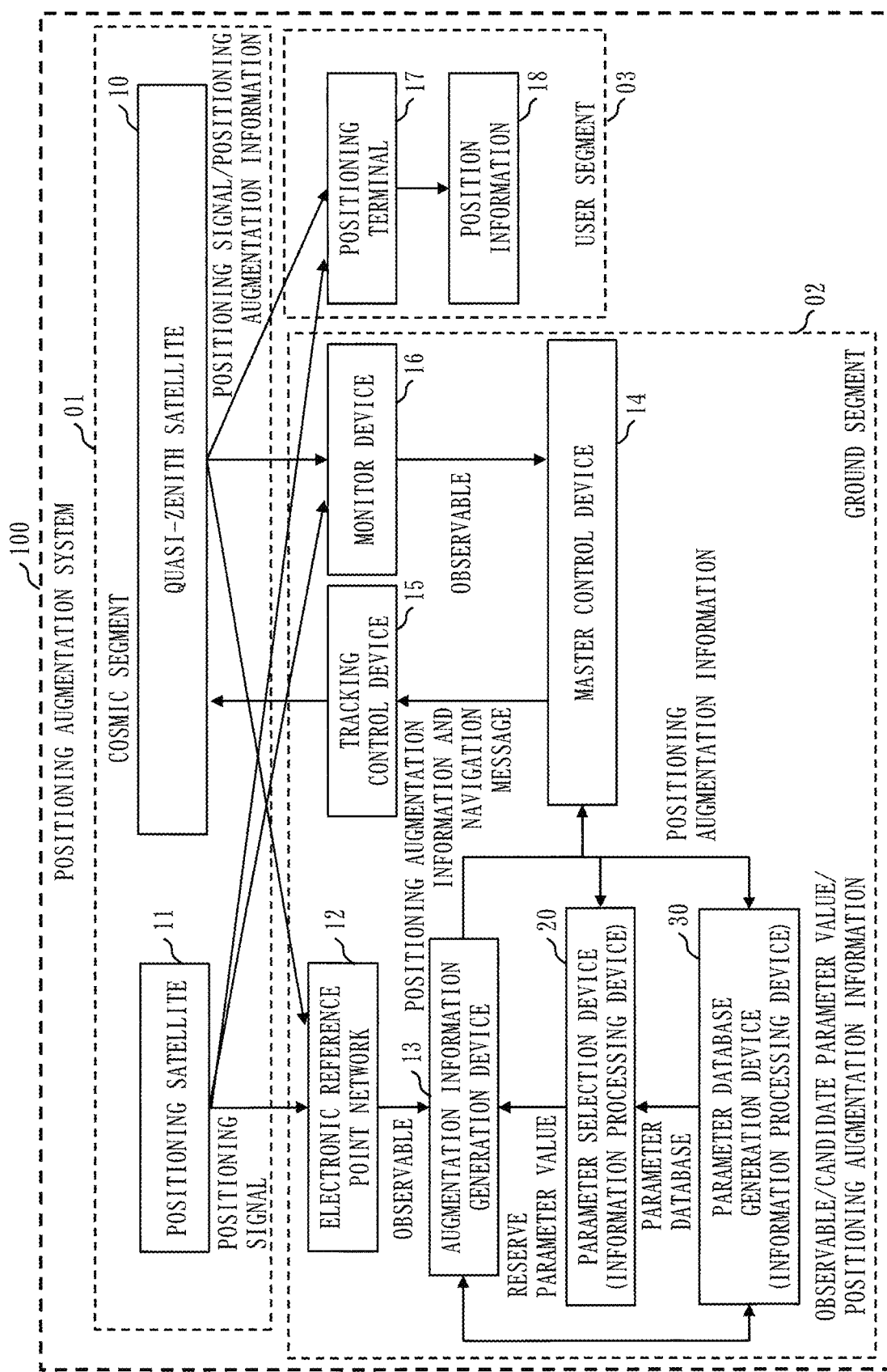
FIG. 4 is a diagram illustrating a configuration example of a positioning augmentation system according to Embodiment 2.

FIG. 4 illustrates a configuration example of the positioning augmentation system 100 according to the embodiment.

Compared with the configuration of FIG. 1, a parameter database generation device 30 is added in FIG. 4.

Elements other than the parameter database generation device 30 are identical to elements illustrated in Embodiment 1 and description thereof is therefore omitted.

In the embodiment, incidentally, the parameter selection device 20 and the parameter database generation device 30 are equivalent to the information processing device.

The parameter database generation device 30 determines the plurality of reserve parameter values that are to be set in the parameter database 23 of the parameter selection device 20 before operations of the augmentation information generation device 13 are started.

Figure 5:
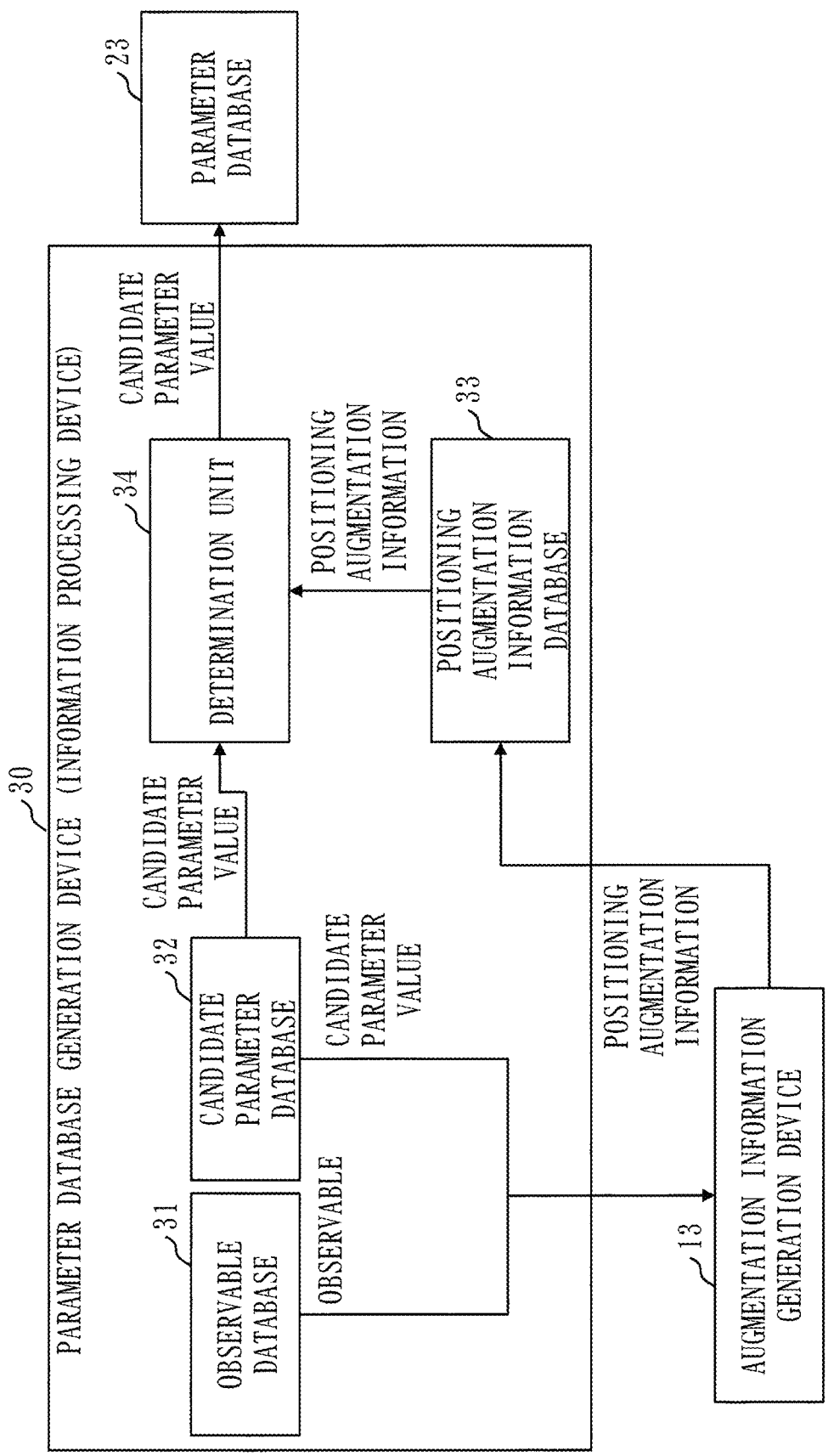
FIG. 5 is a diagram illustrating a functional configuration example of a parameter database generation device according to Embodiment 2.

FIG. 5 illustrates a functional configuration example of the parameter database generation device 30.

The parameter database generation device 30 includes an observable database 31, a candidate parameter database 32, a positioning augmentation information database 33, and a determination unit 34.

The observable database 31 retains the observables under a plurality of conditions (on an occasion when a tropospheric disturbance or a magnetic storm occurs, for instance).

The candidate parameter database 32 retains, for each of the electronic reference points, a plurality of parameter values that cause the positioning augmentation information calculated by the augmentation information generation device 13 to have a low likelihood of exhibiting an abnormal fluctuation in a case where a tropospheric disturbance or a magnetic storm occurs, for instance.

The parameter values retained by the candidate parameter database 32 will be referred to as candidate parameter values. The candidate parameter values are candidates for the reserve parameter values that are to be retained in the parameter database 23 of the parameter selection device 20. The number of the candidate parameter values is equal to or greater than the number of the reserve parameter values.

In the embodiment, the number of the reserve parameter values is assumed to be m ($m \geq 2$). In this case, the number of the candidate parameter values is n ($n \geq m$).

The positioning augmentation information database 33 retains the positioning augmentation information generated by the augmentation information generation device 13.

More specifically, the positioning augmentation information generated with use of the candidate parameter values is retained.

The determination unit 34 analyzes a fluctuation situation in the positioning augmentation information retained in the positioning augmentation information database 33 and determines m candidate parameter values that are to be used as m reserve parameter values, from among n candidate parameter values, for each of the electronic reference points.

As with the parameter selection device 20, the parameter database generation device 30 is a computer. As with the parameter selection device 20, additionally, the parameter database generation device 30 includes a processor, a main storage device, an auxiliary storage device, and a communication device, as a hardware configuration.

The determination unit 34 is implemented by a program. The program that implements the determination unit 34 is executed by the processor.

The observable database 31, the candidate parameter database 32, and the positioning augmentation information database 33 are implemented by the main storage device or the auxiliary storage device.

\*\*\*Description of Operations\*\*\*

Figure 6:
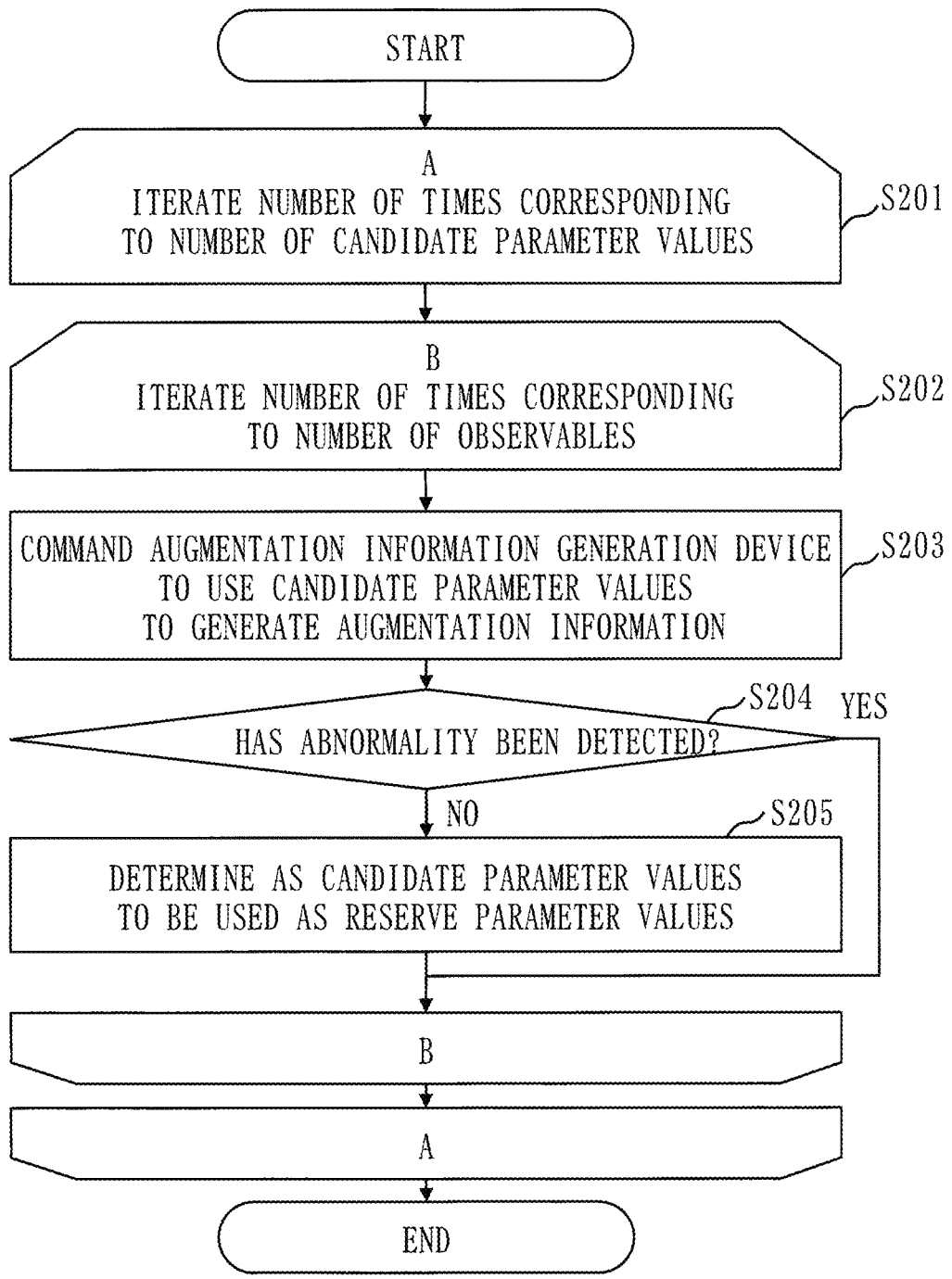
FIG. 6 is a flow chart illustrating an example of operations of the parameter database generation device according to Embodiment 2.

With reference to FIG. 6, subsequently, an example of operations of the parameter database generation device 30 will be described.

The determination unit 34 commands the augmentation information generation device 13 to use the candidate parameter values to generate the positioning augmentation information (step S201 to step S203).

That is, the determination unit 34 commands the augmentation information generation device 13 to use each of the n candidate parameter values to generate n pieces of the positioning augmentation information, for each of the electronic reference points.

Subsequently, the determination unit 34 monitors the n pieces of positioning augmentation information that have been outputted by the augmentation information generation device 13, for each of the electronic reference points.

The positioning augmentation information generated by the augmentation information generation device 13 is retained in the positioning augmentation information database 33 for a given time period (one hour, for instance). The determination unit 34 analyzes a fluctuation situation in the n pieces of positioning augmentation information that are retained in the positioning augmentation information database 33 and determines the candidate parameter values that have been used for the generation of the positioning augmentation information in which the fluctuation is equal to or smaller than the threshold, as the candidate parameter values that are to be used as the reserve parameter values.

More specifically, in a case where the positioning augmentation information has not fluctuated by an extraordinarily great amount exceeding the threshold in a given time period (one hour, for instance) (NO in step S204), the determination unit 34 determines the candidate parameter values that have been used for the generation of the positioning augmentation information, as the candidate parameter values that are to be used as the reserve parameter values (step S205).

Incidentally, the determination unit 34 may detect an abnormal fluctuation in the positioning augmentation information with use of machine learning or the like.

In this manner, the determination unit 34 determines the m candidate parameter values that are to be used as the m reserve parameter values, from among the n candidate parameter values, for each of the electronic reference points.

In a case where more than m candidate parameter values have been obtained as a result of a process of FIG. 6, the determination unit 34 selects the m candidate parameter values in ascending order of the fluctuation in the positioning augmentation information.

In a case where only less than m candidate parameter values have been obtained as a result of iteration of the process of FIG. 6, the determination unit 34 compensates for short candidate parameters in the ascending order of the fluctuation in the positioning augmentation information.

After that, the determination unit 34 sets the determined m candidate parameter values, as the m reserve parameter values, in the parameter database 23, for each of the electronic reference points.

Subsequently, the positioning augmentation information database 24 selects reserve parameter values to be used as new specified parameter values, from among the m reserve parameter values set in the parameter database 23, as described in Embodiment 1.

\*\*\*Description of Effects of Embodiment\*\*\*

According to the embodiment, the reserve parameter values that have a low likelihood of causing the abnormal fluctuation in the positioning augmentation information thus can be obtained.

Embodiment 3

In the present embodiment, differences from Embodiment 1 will be mainly described.

Incidentally, matters that will not be described below are the same as matters of Embodiment 1.

Figure 7:
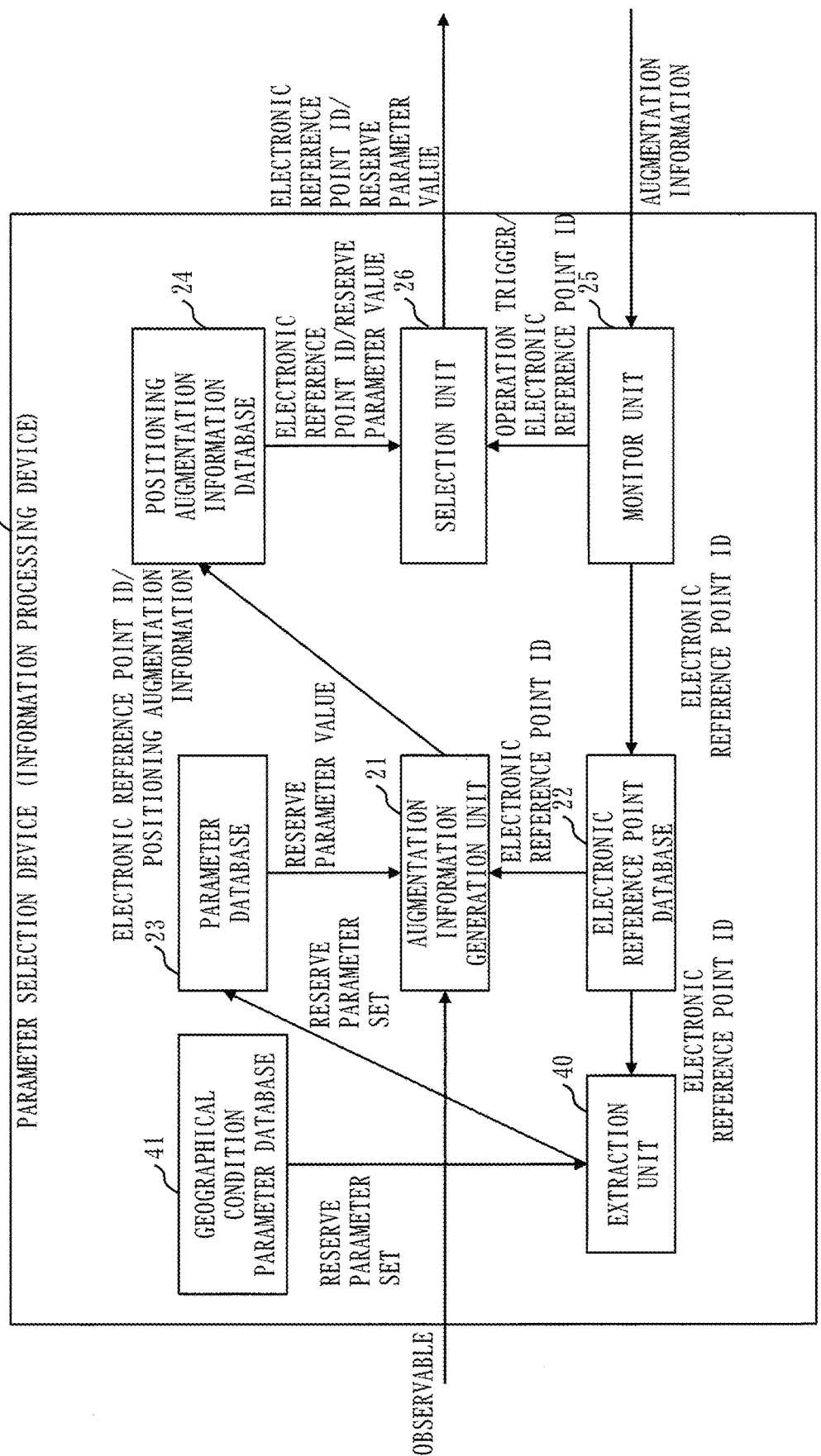
FIG. 7 is a diagram illustrating a functional configuration example of a parameter selection device according to Embodiment 3.

FIG. 7 illustrates a functional configuration example of the parameter selection device 20 according to the embodiment.

Compared with the configuration of FIG. 2, an extraction unit 40 and a geographical condition parameter database 41 are added in FIG. 7.

Elements other than the extraction unit 40 and the geographical condition parameter database 41 are identical to elements illustrated in Embodiment 1 and description thereof is therefore omitted.

In the geographical condition parameter database 41, a plurality of reserve parameter values are set in each of a plurality of geographical conditions.

Figure 8:
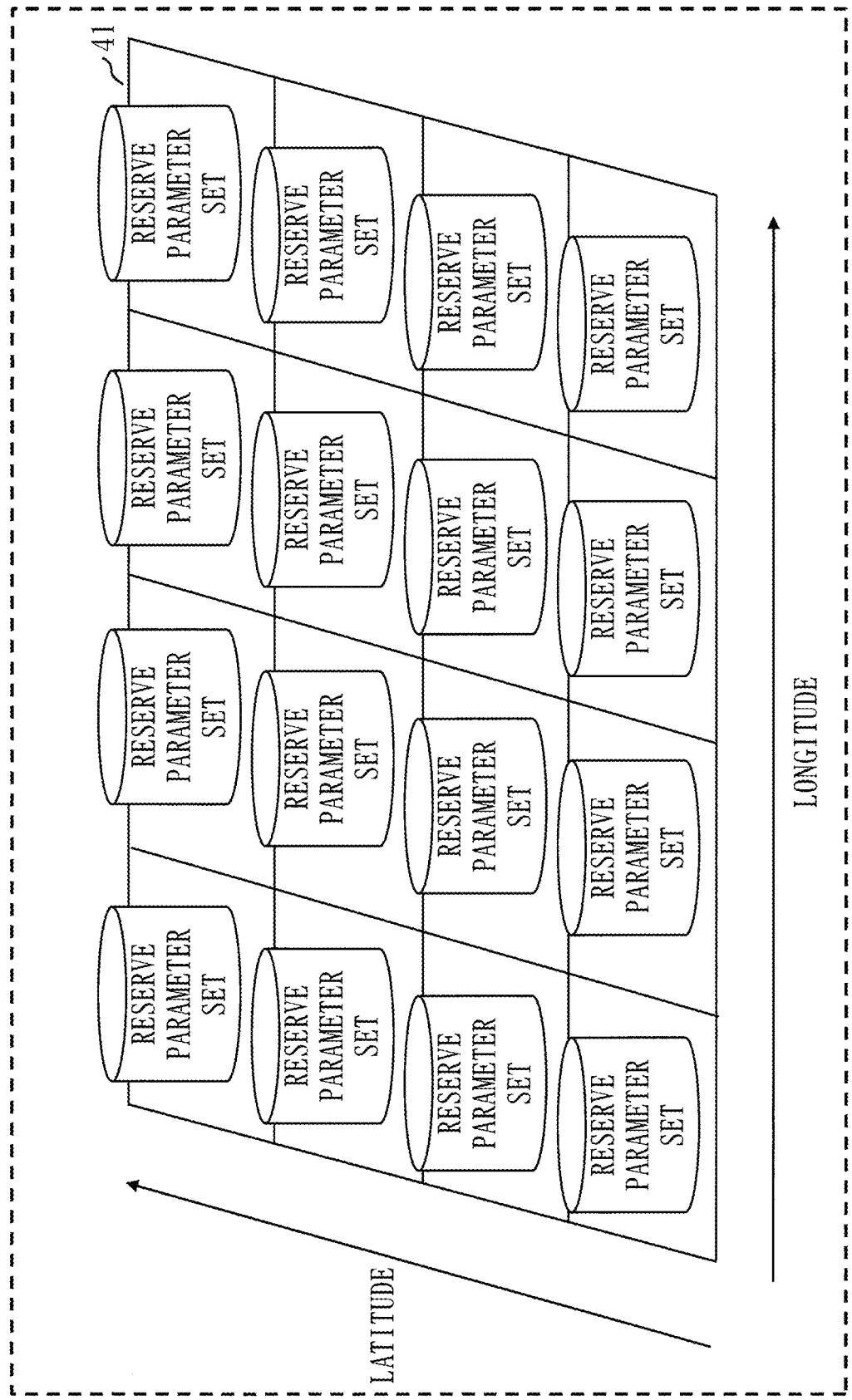
FIG. 8 is a diagram illustrating an example of arrangement of reserve parameter sets according to Embodiment 3.

FIG. 8 is a management image of reserve parameter sets in the geographical condition parameter database 41.

In the geographical condition parameter database 41 of FIG. 8, a region is split into subregions (specified by combinations of latitudes and longitudes) and each of the subregions is managed as a geographical condition. In the geographical condition parameter database 41 of FIG. 8, a reserve parameter set is set for each of the subregions. The m reserve parameter values are included in each of the reserve parameters sets.

Incidentally, the geographical conditions are not limited to the subregions based on the latitudes and the longitudes. The geographical conditions may be climatic zones (such as temperate zone and torrid zone), area ratio of land to ocean, or the like, for instance.

The extraction unit 40 acquires the ID of an electronic reference point from the electronic reference point database 22 and calculates the latitude and the longitude of the electronic reference point before the operations of the augmentation information generation device 13 are started. Then the extraction unit 40 extracts the reserve parameter set in the subregion corresponding to the latitude and the longitude of the electronic reference point that have been calculated, from the geographical condition parameter database 41. Then the extraction unit 40 sets the extracted reserve parameter set in the parameter database 23.

The augmentation information generation unit 21 acquires the reserve parameter set (m reserve parameter values) for each of the electronic reference points from the parameter database 23 and generates m pieces of the positioning augmentation information with use of each reserve parameter set (m reserve parameter values), as with Embodiment 1.

Meanwhile, in a case where an abnormality occurs in the positioning augmentation information of the augmentation information generation device 13, the positioning augmentation information database 24 selects the reserve parameter values that are to substitute the specified parameter values, from among the m reserve parameter values, as with Embodiment 1.

In the embodiment, in this manner, the extraction unit 40 sets in the parameter database 23, for each of the electronic reference points, the m reserve parameter values set for the geographical condition corresponding to the geographical condition of the electronic reference point, among the reserve parameter sets each of which is set for each of the geographical conditions in the geographical condition parameter database 41.

According to the embodiment, in a case where an abnormality occurs in the positioning augmentation information of the augmentation information generation device 13, the reserve parameter values that conform to the geographical condition of the electronic reference point can be applied consequently.

Embodiment 4

In the present embodiment, differences from Embodiment 1 will be mainly described.

Incidentally, matters that will not be described below are the same as matters of Embodiment 1.

Figure 9:
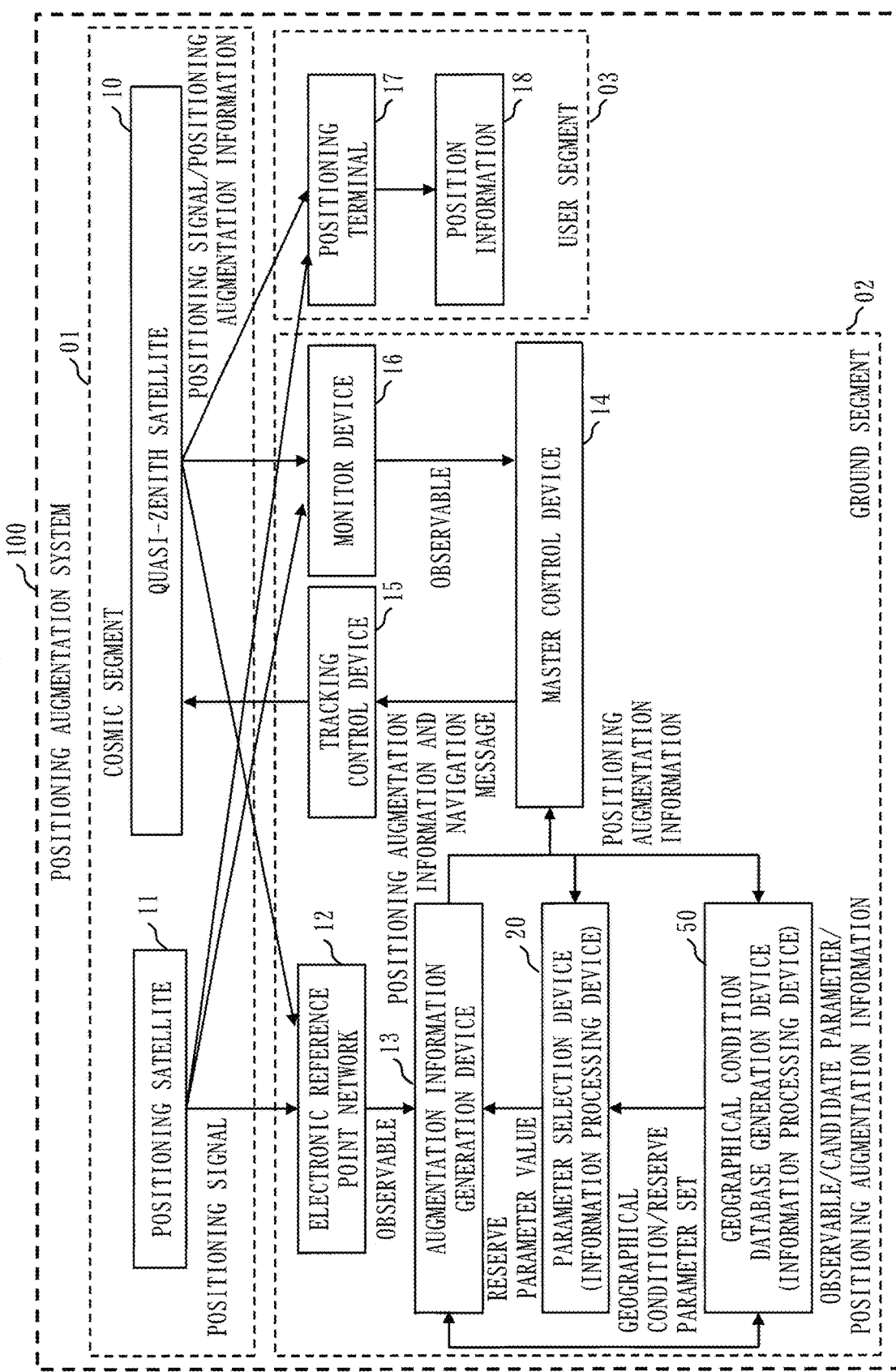
FIG. 9 is a diagram illustrating a configuration example of a positioning augmentation system according to Embodiment 4.

FIG. 9 illustrates a configuration example of the positioning augmentation system 100 according to the embodiment.

Compared with the configuration of FIG. 1, a geographical condition database generation device 50 is added in FIG. 9.

Elements other than the geographical condition database generation device 50 are identical to elements illustrated in Embodiment 1 and description thereof is therefore omitted.

The geographical condition database generation device 50 generates a plurality of reserve parameter sets that are to be set in the geographical condition parameter database 41 described in Embodiment 3, before the operations of the augmentation information generation device 13 are started.

In the embodiment, the parameter selection device 20 and the geographical condition database generation device 50 are equivalent to the information processing device.

Figure 10:
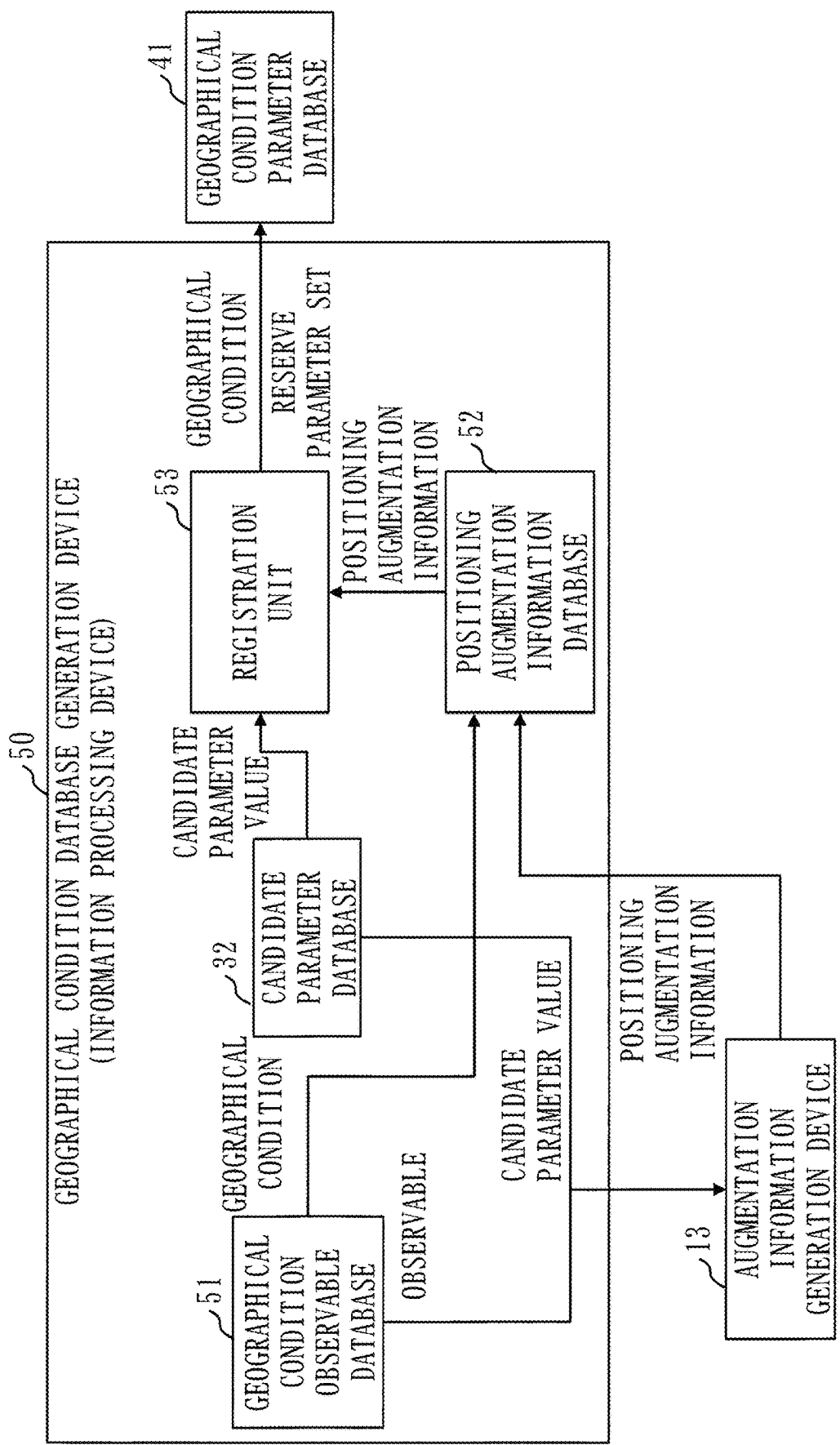
FIG. 10 is a diagram illustrating a functional configuration example of a geographical condition database generation device of Embodiment 4.

FIG. 10 illustrates a functional configuration example of the geographical condition database generation device 50.

The geographical condition database generation device 50 includes the candidate parameter database 32, a geographical condition observable database 51, a positioning augmentation information database 52, and a registration unit 53.

As with the parameter selection device 20, the geographical condition database generation device 50 is a computer. As with the parameter selection device 20, additionally, the geographical condition database generation device 50 includes a processor, a main storage device, an auxiliary storage device, and a communication device, as a hardware configuration.

The registration unit 53 is implemented by a program. The program that implements the registration unit 53 is executed by the processor.

The candidate parameter database 32, the geographical condition observable database 51, and the positioning augmentation information database 52 are implemented by the main storage device or the auxiliary storage device.

The candidate parameter database 32 is the same as that described in Embodiment 2. That is, the candidate parameter database 32 retains, for each of the electronic reference points, a plurality of parameter values (candidate parameter values) that cause the positioning augmentation information calculated by the augmentation information generation device 13 to have a low likelihood of exhibiting a fluctuation in an extraordinarily great amount in a case where a tropospheric disturbance or a magnetic storm occurs, for instance.

The geographical condition observable database 51 retains observables under a plurality of conditions for each of the geographical conditions (the subregions illustrated in FIG. 8, for instance). The geographical condition observable database 51 retains the observables on an occasion when a tropospheric disturbance or a magnetic storm occurs, for instance.

The positioning augmentation information database 52 acquires the positioning augmentation information from the augmentation information generation device 13 and retains the acquired positioning augmentation information. Additionally, the positioning augmentation information database 52 acquires the geographical conditions from the geographical condition observable database 51.

The augmentation information generation device 13 acquires a plurality of parameter values (candidate parameter values) from the candidate parameter database 32 and acquires observables under a plurality of conditions from the geographical condition observable database 51. Then the augmentation information generation device 13 generates the positioning augmentation information with use of the plurality of parameter values and the observables under the plurality of conditions that have been acquired, for each of the geographical conditions.

The positioning augmentation information database 52 accumulates the positioning augmentation information generated by the augmentation information generation device 13. The positioning augmentation information database 52 retains pieces of the positioning augmentation information whose number corresponds to the number of the geographical conditions, the number of the candidate parameter values, and the number of the observables.

In a case where the positioning augmentation information acquired from the positioning augmentation information database 52 has not fluctuated by an extraordinarily great amount exceeding the threshold in a given time period (one hour, for instance), the registration unit 53 acquires the candidate parameter values used for calculation of the positioning augmentation information, from the candidate parameter database 32. Then the registration unit 53 sets the candidate parameter values, along with the geographical conditions acquired from the positioning augmentation information database 52, in the geographical condition parameter database 41.

That is, the registration unit 53 analyzes a fluctuation situation in the positioning augmentation information generated by the augmentation information generation device 13 and determines the m candidate parameter values that are to be registered as the m reserve parameter values in the geographical condition parameter database 41, from among the n (n≥m) candidate parameter values that are candidates for the m (m 2) reserve parameter values, for each of the geographical conditions.

Incidentally, the registration unit 53 may detect an abnormality in the positioning augmentation information with use of machine learning or the like.

In the embodiment, in this manner, the registration unit 53 analyzes the fluctuation situation in the positioning augmentation information from the augmentation information generation device 13 and determines the m reserve parameter values that are to be set in the geographical condition parameter database 41.

According to the embodiment, consequently, the reserve parameter values that have a low likelihood of causing an abnormal fluctuation in the positioning augmentation information can be obtained.

Embodiment 5

In the present embodiment, differences from Embodiment 1 will be mainly described.

Incidentally, matters that will not be described below are the same as matters of Embodiment 1.

Figure 11:
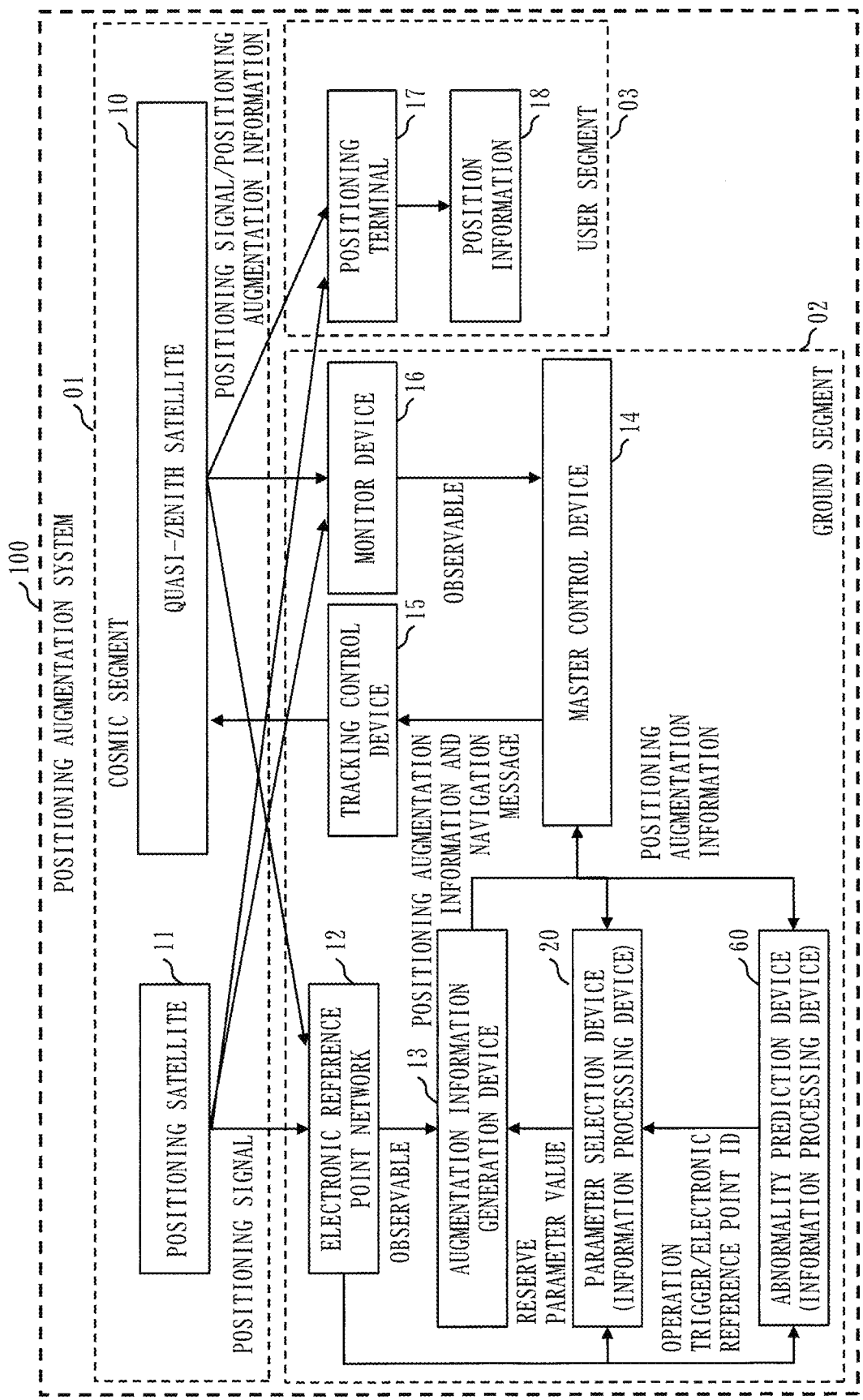
FIG. 11 is a diagram illustrating a configuration example of a positioning augmentation system according to Embodiment 5.

FIG. 11 illustrates a configuration example of the positioning augmentation system 100 according to the embodiment.

Compared with the configuration of FIG. 1, an abnormality prediction device 60 is added in FIG. 11.

Elements other than the abnormality prediction device 60 are identical to elements illustrated in Embodiment 1 and description thereof is therefore omitted.

The abnormality prediction device 60 predicts output of the positioning augmentation information that exhibits an abnormal fluctuation, based on a fluctuation pattern of the observables outputted by the electronic reference point network 12. Additionally, the abnormality prediction device 60 causes the parameter selection device 20 to operate before the augmentation information generation device 13 outputs the positioning augmentation information that exhibits the abnormal fluctuation. As a result, the parameter selection device 20 is capable of changing the specified parameter value to be used in the augmentation information generation device 13 before the augmentation information generation device 13 outputs the positioning augmentation information that exhibits the abnormal fluctuation.

In the embodiment, the parameter selection device 20 and the abnormality prediction device 60 are equivalent to the information processing device.

Figure 12:
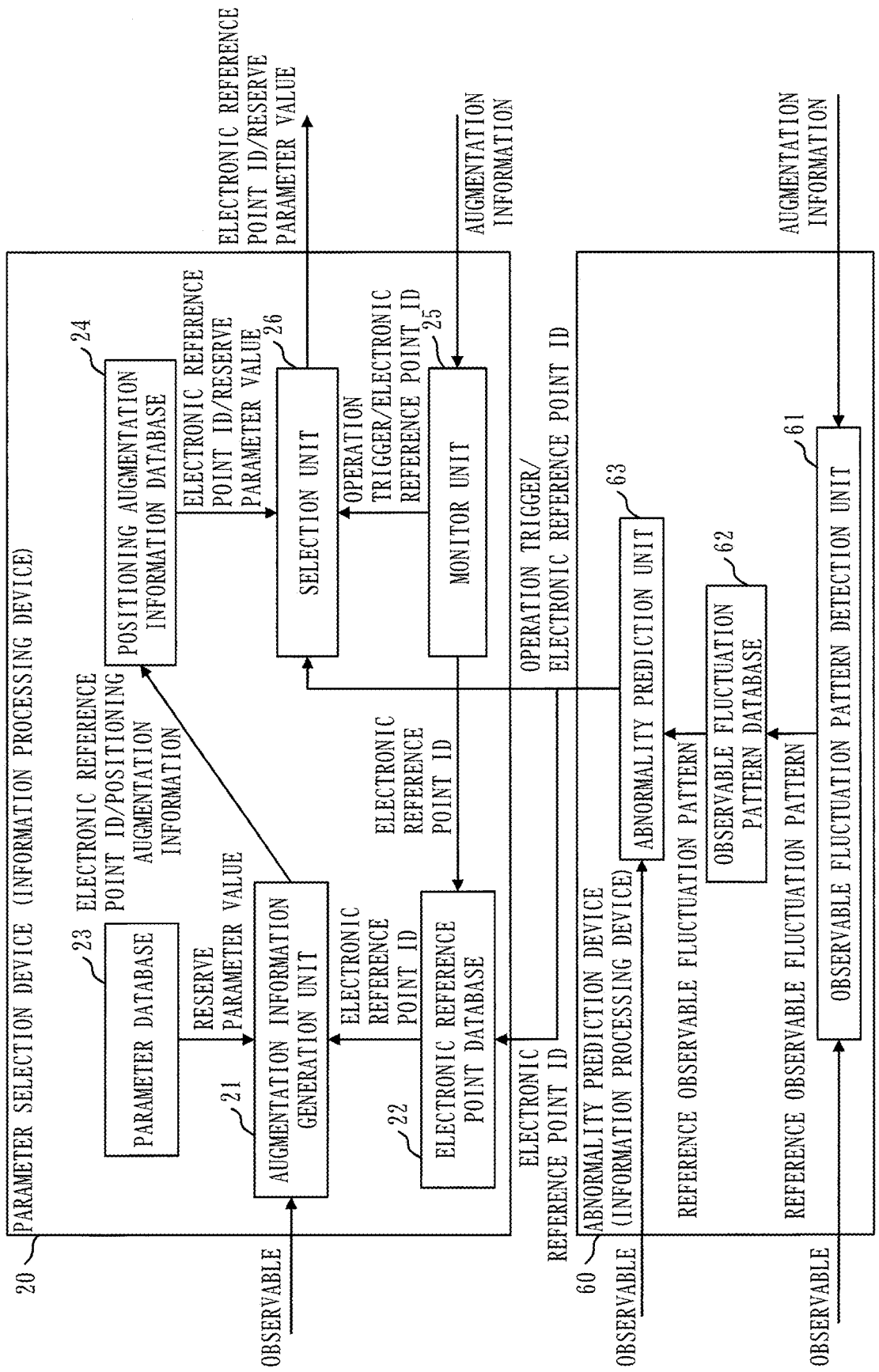
FIG. 12 is a diagram illustrating a functional configuration example of a parameter selection device and an abnormality prediction device according to Embodiment 5.

FIG. 12 illustrates a functional configuration example of the parameter selection device 20 and the abnormality prediction device 60.

The functional configuration example of the parameter selection device 20 is identical to that illustrated in FIG. 2 and description thereof is therefore omitted.

The abnormality prediction device 60 includes an observable fluctuation pattern detection unit 61, an observable fluctuation pattern database 62, and an abnormality prediction unit 63.

As with the parameter selection device 20, the abnormality prediction device 60 is a computer. As with the parameter selection device 20, additionally, the abnormality prediction device 60 includes a processor, a main storage device, an auxiliary storage device, and a communication device, as a hardware configuration.

The observable fluctuation pattern detection unit 61 and the abnormality prediction unit 63 are implemented by a program. The program that implements the observable fluctuation pattern detection unit 61 and the abnormality prediction unit 63 is executed by the processor.

The observable fluctuation pattern database 62 is implemented by the main storage device or the auxiliary storage device.

The observable fluctuation pattern detection unit 61 retains the observables that have been outputted by the electronic reference point network 12 for each of the electronic reference points for a given time period (one hour, for instance).

Additionally, the observable fluctuation pattern detection unit 61 monitors the positioning augmentation information that has been outputted by the augmentation information generation device 13 for each of the electronic reference points and retains the positioning augmentation information for a given time period (one hour, for instance).

In a case where the positioning augmentation information for any of the electronic reference points has fluctuated by an extraordinarily great amount exceeding the threshold in a given time period (one hour, for instance), additionally, the observable fluctuation pattern detection unit 61 calculates a fluctuation range of the retained observables for the electronic reference point for the given time period, at intervals of a given time (five minutes, for instance). Then the observable fluctuation pattern detection unit 61 detects an observable fluctuation pattern and outputs the detected observable fluctuation pattern to the observable fluctuation pattern database 62. Incidentally, the observable fluctuation pattern detected by the observable fluctuation pattern detection unit 61 is a fluctuation pattern of the observables that occurs before an abnormality in the positioning augmentation information occurs. The observable fluctuation pattern extracted by the observable fluctuation pattern detection unit 61 will be referred to below as reference observable fluctuation pattern.

The observable fluctuation pattern database 62 retains the reference observable fluctuation pattern outputted by the observable fluctuation pattern detection unit 61.

The abnormality prediction unit 63 monitors the observables outputted by the electronic reference point network 12 for each of the electronic reference points, calculates the fluctuation range of the observables at intervals of a given time (five minutes, for instance), and thereby generates the observable fluctuation pattern. Additionally, the abnormality prediction unit 63 retains the generated observable fluctuation pattern. Hereinbelow, the observable fluctuation pattern generated by the abnormality prediction unit 63 will be referred to as a generated observable fluctuation pattern.

Additionally, the abnormality prediction unit 63 makes a comparison between the reference observable fluctuation pattern acquired from the observable fluctuation pattern database 62 and the generated observable fluctuation pattern being retained, for each of the electronic reference points. In a case where the generated observable fluctuation pattern coincides with the reference observable fluctuation pattern for a given time period (30 minutes, for instance), the abnormality prediction unit 63 predicts an abnormality in the positioning augmentation information. Thus the abnormality prediction unit 63 notifies the electronic reference point database 22 of the ID of the electronic reference point whose generated observable fluctuation pattern coincides with the reference observable fluctuation pattern. Additionally, the abnormality prediction unit 63 outputs the operation trigger and the ID of the electronic reference point whose generated observable fluctuation pattern coincides with the reference observable fluctuation pattern, to the selection unit 26.

In the parameter selection device 20, as with Embodiment 1, the selection unit 26 selects the reserve parameter values that are to substitute for the specified parameter values.

In the embodiment, in this manner, the reserve parameter values that are to substitute for the specified parameter values can be selected before an abnormality in the positioning augmentation information is detected. According to the embodiment, therefore, abnormal positioning augmentation information is not outputted but only normal positioning augmentation information is outputted.

While the embodiments of the present invention have been described in the foregoing, two or more of these embodiments may be combined and implemented.

Alternatively, one of these embodiments may be partially implemented.

Alternatively, two or more of these embodiments may be partially combined and implemented.

Note that the present invention is not limited to these embodiments and can be variously modified as required.

\*\*\*Description of Hardware Configuration\*\*\*

Finally, a supplementary description of the hardware configuration of the parameter selection device 20 will be given.

The processor 901 is an IC (Integrated Circuit) to carry out processing.

The processor 901 is a CPU (Central Processing Unit), a DSP (Digital Signal Processor), or the like.

The main storage device 902 is a RAM (Random Access Memory).

The auxiliary storage device 903 is a ROM (Read Only Memory), a flash memory, an HDD (Hard Disk Drive), or the like.

The communication device 904 is an electronic circuit to carry out communication processing of data.

The communication device 904 is a communication chip or an NIC (Network Interface Card), for instance.

An OS (Operating System) is also stored in the auxiliary storage device 903.

At least a portion of the OS is executed by the processor 901.

The processor 901 executes the programs that implement the functions of the augmentation information generation unit 21, the monitor unit 25, the selection unit 26, and the extraction unit 40 while executing at least a portion of the OS.

Task management, memory management, file management, communication control, or the like is carried out through execution of the OS by the processor 901.

At least any of information, data, signal values, and variable values that indicate results of processes in the augmentation information generation unit 21, the monitor unit 25, the selection unit 26, and the extraction unit 40 is stored in at least any of the main storage device 902, the auxiliary storage device 903, and a register and a cache memory in the processor 901.

The programs that implement the functions of the augmentation information generation unit 21, the monitor unit 25, the selection unit 26, and the extraction unit 40 may be stored in a portable recording medium such as a magnetic disc, a flexible disk, an optical disk, a compact disc, a Blu-ray (registered trademark) disc, or a DVD. The portable storage medium in which the programs that implement the functions of the augmentation information generation unit 21, the monitor unit 25, the selection unit 26, and the extraction unit 40 are stored may be commercially distributed.

The "unit" of the augmentation information generation unit 21, the monitor unit 25, the selection unit 26, and the extraction unit 40 may be read as "circuit", "step", "procedure", or "process".

The parameter selection device 20 may be implemented by a processing circuit. The processing circuit is a logic IC (Integrated Circuit), a GA (Gate Array), an ASIC (Application Specific Integrated Circuit), or an FPGA (Field-Programmable Gate Array), for instance.

In this case, the augmentation information generation unit 21, the monitor unit 25, the selection unit 26, and the extraction unit 40 are each implemented as a portion of the processing circuit.

Herein, a superordinate concept of the processor and the processing circuit is referred to as "processing circuitry".

That is, the processor and the processing circuit are specific examples of "processing circuitry".

Foregoing description of the hardware configuration can be applied to the parameter database generation device 30, the extraction unit 40, the geographical condition database generation device 50, and the abnormality prediction device 60, as well.

REFERENCE SIGNS LIST

01: cosmic segment; 02: ground segment; 03: user segment; 10: quasi-zenith satellite; 11: positioning satellite; 12: electronic reference point network; 13: augmentation information generation device; 14: master control device; 15: tracking control device; 16: monitor device; 17: positioning terminal; 18: position information; 20: parameter selection device; 21: augmentation information generation unit; 22: electronic reference point database; 23: parameter database; 24: positioning augmentation information database; 25: monitor unit; 26: selection unit; 30: parameter database generation device; 31: observable database; 32: candidate parameter database; 33: positioning augmentation information database; 34: determination unit; 40: extraction unit; 41: geographical condition parameter database; 50: geographical condition database generation device; 51: geographical condition observable database; 52: positioning augmentation information database; 53: registration unit; 60: abnormality prediction device; 61: observable fluctuation pattern detection unit; 62: observable fluctuation pattern database; 63: abnormality prediction unit; 100: positioning augmentation system; 200: positioning augmentation system; 901: processor; 902: main storage device; 903: auxiliary storage device; 904: communication device.

The invention claimed is:

1. An information processing device comprising:
processing circuitry:
to monitor positioning augmentation information for correction of satellite positioning errors, the positioning augmentation information being generated by an augmentation information generation device with use of a predetermined parameter value;
to select, in a case where an abnormality is detected in the positioning augmentation information, a reserve parameter value that is to substitute for the predetermined parameter value, from among a plurality of reserve parameter values being a plurality of parameter values that are different from the predetermined parameter value and to command the augmentation information generation device to use the selected reserve parameter value as a new parameter value; and to determine, from among n (n≥m) candidate parameter values that are candidates for m (m≥2) reserve parameter values, m candidate parameter values that are to be used as the m reserve parameter values.

2. The information processing device according to claim 1, wherein the processing circuitry generates a plurality of pieces of positioning augmentation information with use of the plurality of reserve parameter values in parallel with generation of the positioning augmentation information by the augmentation information generation device, and analyzes the plurality of pieces of positioning augmentation information and selects a reserve parameter value that is to substitute for the predetermined parameter value from among the plurality of reserve parameter values.

3. The information processing device according to claim 2, wherein the processing circuitry analyzes a fluctuation situation in each of the plurality of pieces of positioning augmentation information and selects a reserve parameter value used for generation of the positioning augmentation information whose fluctuation is the smallest, from among the plurality of reserve parameter values.

4. The information processing device according to claim 1, wherein the processing circuitry causes the augmentation information generation device to generate n pieces of positioning augmentation information with use of the n candidate parameter values, analyzes the n pieces of positioning augmentation information that are generated by the augmentation information generation device, and determines the m candidate parameter values.

5. The information processing device according to claim 4, wherein the processing circuitry analyzes a fluctuation situation in each of the n pieces of positioning augmentation information and selects a candidate parameter value used for generation of the positioning augmentation information whose fluctuation is equal to or smaller than a threshold, from among the n candidate parameter values.

6. The information processing device according to claim 1, wherein the processing circuitry extracts from a geographical condition parameter database in which a plurality of reserve parameter values are set in each of a plurality of geographical conditions, a plurality of reserve parameter values set in a geographical condition corresponding to a geographical condition of an electronic reference point, and selects a reserve parameter value that is to substitute for the predetermined parameter value from among the plurality of reserve parameter values extracted.

7. The information processing device according to claim 6, wherein the processing circuitry registers a plurality of reserve parameter values corresponding to each of the plurality of geographical conditions, in the geographical condition parameter database.

8. The information processing device according to claim 7, wherein the processing circuitry determines the m candidate parameter values for each of the geographical conditions.

9. The information processing device according to claim 1, wherein the processing circuitry predicts an abnormality in the positioning augmentation information, and selects a reserve parameter value that is to substitute for the predetermined parameter value from among the plurality of reserve parameter values, in a case where an abnormality is predicted even though no abnormality is detected.

10. The information processing device according to claim 9, wherein the processing circuitry monitors an observable of an electronic reference point and predicts an abnormality in the positioning augmentation information in a case where a fluctuation pattern of the observable of the electronic reference point coincides with a fluctuation pattern of the observable that occurs before an abnormality in the positioning augmentation information occurs.

11. The information processing device according to claim 1, wherein the positioning augmentation information is generated based on a difference between a calculated coordinate value of a geographic reference point and a known coordinate value of the geographic reference point.

12. An information processing method comprising:

monitoring positioning augmentation information for correction of satellite positioning errors, the positioning augmentation information being generated by an augmentation information generation device with use of a predetermined parameter value;

selecting, in a case where an abnormality is detected in the positioning augmentation information by the monitoring, a reserve parameter value that is to substitute for the predetermined parameter value; from among a plurality of reserve parameter values being a plurality of parameter values that are different from the predetermined parameter value and commanding the augmentation information generation device to use the selected reserve parameter value as a new parameter value; and determining, from among n (n≥m) candidate parameter values that are candidates for m (m≥2) reserve parameter values, m candidate parameter values that are to be used as the m reserve parameter values.

13. The information processing device according to claim 12, wherein the positioning augmentation information is generated based on a difference between a calculated coordinate value of a geographic reference point and a known coordinate value of the geographic reference point.

14. A non-transitory computer readable medium storing an information processing program that causes a computer to execute:

a monitor process of monitoring positioning augmentation information for correction of satellite positioning errors, the positioning augmentation information being generated by an augmentation information generation device with use of a predetermined parameter value;

a selection process of, in a case where an abnormality is detected in the positioning augmentation information by the monitor process, selecting a reserve parameter value that is to substitute for the predetermined parameter value, from among a plurality of reserve parameter values being a plurality of parameter values that are different from the predetermined parameter value and commanding the augmentation information generation device to use the selected reserve parameter value as a new parameter value; and a determining process of determining, from among n (n≥m) candidate parameter values that are candidates for m (m≥2) reserve parameter values, m candidate parameter values that are to be used as the m reserve parameter values.

15. The information processing device according to claim 14, wherein
the positioning augmentation information is generated based on a difference between a calculated coordinate value of a geographic reference point and a known coordinate value of the geographic reference point.

16. An information processing device comprising:
processing circuitry:
to monitor positioning augmentation information for correction of satellite positioning errors, the positioning augmentation information being generated by an augmentation information generation device with use of a predetermined parameter value; and to select, in a case where an abnormality is detected in the positioning augmentation information, a reserve parameter value that is to substitute for the predetermined parameter value, from among a plurality of reserve parameter values being a plurality of parameter values that are different from the predetermined parameter value and to command the augmentation information generation device to use the selected reserve parameter value as a new parameter value;

to analyze a fluctuation situation in each of a plurality of pieces of positioning augmentation information; and to select a reserve parameter value used for generation of the positioning augmentation information whose fluctuation is the smallest, from among the plurality of reserve parameter values.

* * * * *